United States Patent
Tanino

[19]

[11] Patent Number: 6,063,513
[45] Date of Patent: May 16, 2000

[54] SPECULAR-SURFACE BODY

[75] Inventor: Kichiya Tanino, Hyogo-ken, Japan

[73] Assignee: Nippon Pillar Packing Co., Ltd., Osaka, Japan

[21] Appl. No.: 09/008,486

[22] Filed: Jan. 16, 1998

[30] Foreign Application Priority Data

Jan. 20, 1997 [JP] Japan .................................. 9-007139

[51] Int. Cl.⁷ ................................................... B32B 9/00
[52] U.S. Cl. ...................... 428/698; 428/446; 428/912.2; 359/883
[58] Field of Search ..................... 428/698, 446, 428/912.2, 141, 450; 427/589; 359/883, 515

[56] References Cited

U.S. PATENT DOCUMENTS

| | | | |
|---|---|---|---|
| 5,071,596 | 12/1991 | Goela et al. | 264/1.2 |
| 5,106,687 | 4/1992 | Tanino et al. | 428/141 |
| 5,363,238 | 11/1994 | Akune et al. | 359/566 |
| 5,374,412 | 12/1994 | Pickering et al. | 423/346 |
| 5,406,906 | 4/1995 | Rimai et al. | 117/92 |
| 5,407,750 | 4/1995 | Knioshita et al. | 428/450 |
| 5,448,418 | 9/1995 | Hotate et al. | 359/883 |

*Primary Examiner*—Timothy Speer
*Assistant Examiner*—Stephen Stein
*Attorney, Agent, or Firm*—Griffin, Butler, Whisenhunt & Szipl, LLP

[57] ABSTRACT

A specular-surface body (1) which has a sufficient resistance against irradiation of high energy beams—such as X-rays, SOR beams, laser beams, etc.—can be suitably used as reflecting mirrors, diffraction gratings, etc. for such high energy beams. The specular-surface body is formed by a silicon carbide film (3) being formed by chemical vapor deposition on a surface of a substrate (2) of silicon carbide sintered material, the film surface then being processed to be a specular surface (3a). There is a defect-free crystal layer (3b) at a depth d of 300 Å from the specular surface (3a) of the silicon carbide film 3. The silicon carbide film (3) has a crystal structure strongly oriented to one crystal plane (for example, the (220) plane) specified by Miller indices in such a manner that its X-ray diffraction intensity ratio becomes 90% or more at a peak intensity.

6 Claims, 1 Drawing Sheet

SPECULAR-SURFACE BODY

BACKGROUND OF THE INVENTION

The present invention relates to specular-surface bodies which may be used as reflecting mirrors, diffraction gratings and the like as well as in optical devices using mainly high-energy beams, such as X-rays, synchrotron radiation beams (SOR beams), laser beams, etc.; and more specifically, the invention relates to specular-surface bodies in which surfaces of top layers made of silicon carbide are processed to be specular surfaces.

A conventional specular-surface body of the above type, one whose top layer is made of a chemically vapor deposited silicon carbide film (hereinafter called a "conventional specular-surface body") is generally known. That is, the conventional specular-surface body comprises a top layer made of a chemically-vapor-deposited silicon carbide film (hereinafter called a "CVD-SiC film"), with high-purity silicon carbide being chemically vapor deposited on a surface of a substrate made of a silicon carbide sintered material or carbon sintered material. A film surface is then processed to be a super smooth specular surface (surface roughness: RMS 10 Å or less) by a mechanical specular-surface processing method such as polishing, etc.

Conventional mirrors are used as X-ray mirrors, and the like, in which a substrate made of copper, or the like, with gold vapor-deposited thereon, is specular surface polished. Others are used in which a multilayer film, whose film thickness is computed and designed on a basis of a wave length, is coated on a substrate to utilize interference effects. But these conventional mirrors are primarily used for relatively small energy beams with long wavelengths (for example, visible light and infrared rays). High energy beams with short-wavelengths, such as X-rays, etc. are apt to cause peeling-off of such coating layers, distortion of such specular surfaces, heat damage, etc., and it is extremely difficult to deal with these problems.

Compared to this, because the conventional specular-surface body provides excellent optical properties, in that the CVD-SiC film, which is the top layer forming the specular surface, has superior physical properties (such as heat resistance, heat conductivity, fastness, and exhibits a superior optical property of high reflection of beams in the short wavelength region), it does not have the problems described in the preceding paragraph, even when high energy beams in short wavelength regions are used. Thus, it is expected to be preferred as an optical element for a reflecting mirror, diffraction grating, etc. for high energy beams, such as X-rays, and the like, in short wavelength regions.

However, when such conventional specular-surface bodies are irradiated by high energy beams, such as X-rays, etc., an irradiated portion is likely to be damaged, posing the problem that resistance against irradiation by high-energy beams is insufficient.

That is, irradiating the specular-surface bodies with high energy beams, such as X-rays, etc., causes an irradiated portion at a specular surface to have an appearance of fine foam and to look as if the irradiated portion were instantaneously melted; thereby generating visible white turbidity (cloudiness). If this kind of damage occurs on the specular surface, the beam reflectivity inevitably decreases, and it is unable to properly carry out functions required of optical elements, such as reflecting mirrors, diffraction gratings, etc. In addition, an absorption rate of high energy beam increases at the damaged portion, and, in an extreme case, breakage of the specular-surface body itself may result. At the white turbidity portion, silicon is deposited in a form having an appearance of fine liquid drops, indicating that the white turbidity is caused by deposition of silicon.

Therefore, the present inventor conducted various experiments for finding causes of this lack of resistance against irradiation by high-energy beams of the conventional specular-surface bodies (in particular, causes of occurrences of damage due to beam irradiation), and reached the conclusion that the lack of resistance primarily results from absence of a defect-free crystal layer of silicon carbide within a certain depth range in the top layer of the specular-surface body.

That is, specular surfaces in conventional specular-surface bodies, as described above, with surface roughness of RMS 10 Å or lower are obtained by mechanical surface polishing methods (specular-surface processing methods) such as polishing, etc.; but such mechanical surface polishing methods cause, for instance, continuous formation of microcracks. It has been confirmed that a physical impact (hereinafter called a "physical processing force") for scraping away crystals forming irregularities on CVD-SiC film surfaces greatly disturbs atomic arrangements on the specular processed surfaces and portions immediately under the surfaces; thus, layers are formed whose qualities are changed by the machining processing (hereinafter referred to as "quality changed layers") accompanied by a processing strain and/or crystalline dislocation, etc. It has been determined that existence of such quality changed layers result in lowering resistance against beam irradiation and lead to damage from beam irradiation. For example, when high-energy beams are radiated onto a portion where a regularity of atomic arrangement is destroyed, that is, where the energy is high enough to promote rearrangement of atoms, an excessive silicon is deposited outside of a lattice of silicon carbide during the atom rearranging, with the result that white turbidity occurs.

On the other hand, generation of the quality changed layers cannot be avoided by use of an electrical or chemical surface polishing method. Electrical and chemical surface polishing methods do not need physical processing forces, so it is assumed that it is possible to reduce a depth or thickness of the quality changed layer as compared to mechanical surface polishing that requires the physical processing force. Therefore, experiments were carried out using CVD-SiC film coating materials having the defective crystal layers (the quality changed layer) caused by processing strain, etc. which have different depths. the results of the experiments indicated that even if a defective crystal layer is formed in the surface of the CVD-SiC film, no damages due to beam irradiation occurs if the depth of the defective crystal layer is less than a specified level and a defect-free crystal of silicon carbide exists in a range of a specified depth from the film surface. Specifically, even if the quality changed layer or defective crystal layer exists, damages such as formation of the white turbidity does not occur even when high-energy beams such as X-ray, etc. are radiated thereon if the defective crystal layer is extremely shallow and the defect-free crystal layer of silicon carbide exists at a depth within 300 Å from the specular surface.

The present invention was made on the basis of conclusions obtained from findings of these experiments, and it is an object of the present invention to provide a specular-surface body which possesses sufficient resistance against irradiation by high-energy beams, such as X-rays, SOR beams, laser beams, etc. and which can be suitably used as a reflecting mirror, diffraction gratings, etc. for high energy beams.

SUMMARY OF THE INVENTION

According to principles of this invention, a specular-surface body is obtained by processing a surface of a top layer made of silicon carbide to form a specular surface. In particular, the top layer has a defect-free crystal layer of silicon carbide at a depth within 300 Å from the specular surface of the top layer. In other words, the depth (thickness of this layer including the specular surface) of a layer whose quality was changed by the processing (i.e. the quality changed layer) or the machining defective crystal layer caused by the specular-surface processing is less than 300 Å. The specular surface referred to here in the present invention means a super smooth surface of surface roughness RMS less than 10 Å. However, a shape of the specular surface (plane, spherical, nonspherical, etc.) should be optional in accordance with applications of the specular-surface body.

For a specular-surface body according to the present invention, a whole body can be made of a single-crystal structural material of silicon carbide; but, in general, it is desirable to make a specular-surface body of a composite material in which a silicon carbide film is formed on a surface of a substrate by chemical vapor deposition. That is, it is desirable to form a top layer (to be processed to form the specular surface thereon) of a CVD-SiC film. In this event, the CVD-SiC film preferably has a crystal structure which is strongly oriented to one crystal plane specified by Miller indices in such a manner than an X-ray diffraction intensity ratio of the crystal plane becomes 90% or more at peak intensity. Strictly speaking, the X-ray diffraction intensity ratio of "one crystal plane specified by Miller indices", that is to say, "one crystal plane to which the crystal is to be oriented" (hereinafter referred to as "the plane to be oriented to") is defined as a ratio of a peak intensity of "the plane to be oriented to" to a total of peak intensities of all the crystal planes ((111) plane, (220) plane, (311) plane, etc.) including "the plane to be oriented to"; with the peak intensity (subjected to correction by a powder X-ray diffraction value based on a U.S. ATM Standard) being measured by X-ray diffraction equipment. A degree of orientation of the crystal plane is highest at the (111) plane, which is followed by the (220) plane. Therefore, if "the plane to be oriented to" is a crystal plane other than the (111) plane (for example, the (220) plane), in practicality, a ratio of the peak intensity of "the plane to be oriented to" to the total peak intensities of "the plane to be oriented to" and the (111) plane is regarded as the X-ray diffraction intensity ratio of "the plane to be oriented to". If "the plane to be oriented to" is the (111) plane, a ratio of the peak intensity of the (111) plane to the total peak intensity of "the plane to be oriented to" and the (220) plane is regarded as its X-ray diffraction intensity ratio. In this manner, the degree of orientation can be specified. Consequently, for example, if "the plane to be oriented to" is the (220) plane, etc. other than the (111) plane, and its X-ray diffraction intensity ratio is 90%, the X-ray diffraction intensity ratio of the (111) plane should be 10%. If "the plane to be oriented to" is the (111) plane and its X-ray diffraction intensity ratio is 90%, the X-ray diffraction intensity ratio of the (220) plane should be 10%.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

PREFERRED EMBODIMENT OF THE INVENTION

Figure 1:
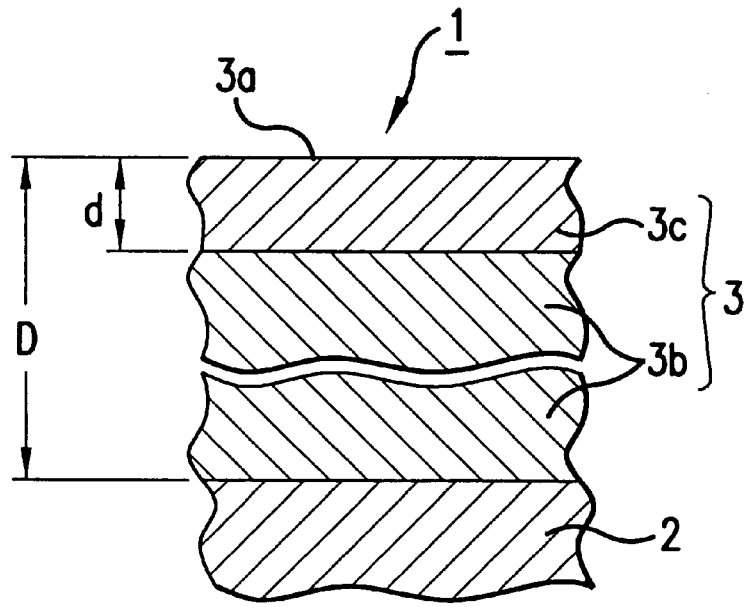
FIG. 1 is a longitudinal cross sectional view of one example of a specular-surface body according to the present invention.
Figure 2:
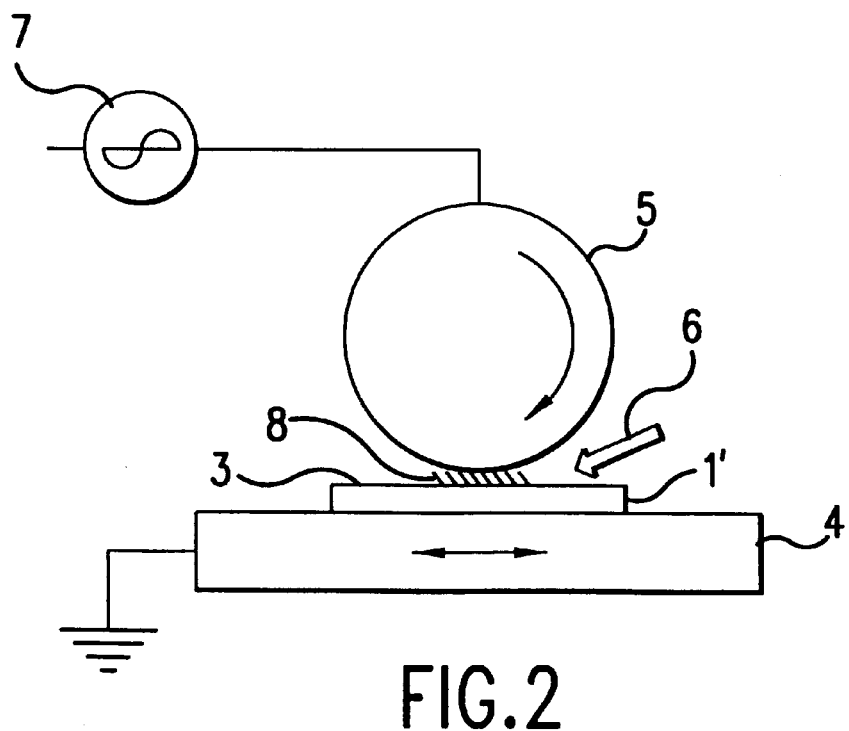
FIG. 2 is a schematic view of one example of a specular-surface processing machine of this invention.

Referring now to FIGS. 1 and 2, the embodiment of the present invention are specifically described.

A specular body 1 of a preferred embodiment is obtained by processing a surface of a silicon carbide film (CVD-SiC film) 3 formed by chemical vapor deposition on, and covering, a surface of a substrate 2, as shown in FIG. 1, to form a specular surface 3a which is a super smooth surface of surface roughness of RMS 10 Å or less, with a defect-free crystal layer 3b existing at a depth d within 300 Å from the specular surface 3a of the CVD-SiC film 3.

This specular-surface body is produced by the following processes.

Firstly, the substrate 2 is formed in a desired shape (for example, a shape determined by a shape of a desired optical element, such as reflecting mirror, diffraction gratings, etc.) in accordance with applications of the specular body 1.

The material of which the substrate 2 is made is determined by uses, use conditions, strength of adhesion with the CVD-SiC film 3, etc.; but in general, sintered materials, such as silicon carbide, carbon, or the like, of as high a purity as possible, are best suited, when influence of impurities evaporated from the substrate 2 during vapor deposition on the purity of the CVD-SiC film 3 is taken into account. In order to exhibit the intrinsic properties of the CVD-SiC film at their best, it is desirable to use sintered materials of α silicon carbide or β silicon carbide of high density, of theoretical density of 90% or higher, and it is desirable to set a surface roughness of the substrate 2 at RMS 1000 Å or lower. If the substrate density is too low, it is impossible to obtain sufficiently-secure mechanical strength, and the like, generally required of a specular-surface body, such as an X-ray concave mirror, or an X-ray convex mirror, or the like; and, in particular, when the substrate 2 is made of porous sintered materials, expanding air from substrate spaces, due to a temperature rise caused by beam irradiation, and the like, tends to create cracks or heat strain. Further, if the specular-surface body 1 is cooled, a coolant, such as cooling water, tends to penetrate the substrate, thereby forming cracks, etc. due to evaporation and expansion of the intruding water. Consequently, in order to provide adequate strength for the substrate, and eventually adequate strength for the specular-surface body, it is desirable to maintain the density of the substrate as high as possible. Needless to say, although the strength of adhesion of the CVD-Sic film 3 to the substrate 2 is important, an orientation to a specific crystal plane, and the like, should also be taken into account; generally speaking, the higher the density of the substrate the better, and there is no particular upper limit. For example, in order to greatly orient the crystal to a specific crystal plane ("the plane to be oriented to"), it is naturally necessary to strictly control conditions of vapor deposition of the film, but, in addition to this, the surface on which the film is to be formed, that is, the surface of the substrate 2, is also important; and when the substrate 2 is porous, with voids existing in great numbers as is the case for sintered carbon material, there is a limit to an orientation of the crystal plane, and it is thus difficult to form the greatly oriented film mentioned above. Consequently, from a viewpoint of the crystal orientation, it is desirable to maintain density of the substrate 2 of the sintered materials at 93% or higher.

The CVD-Sic film 3 is formed on and covers the surface of the substrate 2 and thus a specular-surface body material 1' (see FIG. 2) is obtained.

The CVD-SIC film 3 must have a defect-free crystal construction of high purity and high density in which the crystal is strongly oriented to "the plane to be oriented to" as specified, at one's option, such that its X-ray diffraction intensity is 90% higher; and such CVD-Sic film 3 is formed by, for example, the following technique. This example relates to a case in which the (220) plane is selected as "the plane to be oriented to" and the crystal is strongly oriented to the (220) plane so that its X-ray diffraction intensity ratio becomes 90% (X-ray diffraction intensity ratio of the (111) plane is 10%) in the present CVD-SiC film 3.

First of all, the substrate 2 is placed in a suitable CVD furnace, air is exhausted from an exhaust port of the CVD furnace by a vacuum pump so that an interior of the CVD furnace is maintained at a reduced pressure environment. With this reduced pressure environment, the substrate 2 is heated and held at a given temperature, and then, a predetermined reaction gas is continuously fed into the CVD furnace. At this point, the exhaust process is carried out continuously, without stopping, and the interior of the CVD furnace is held at a specified reduced pressure environment. Normally, it is desirable to hold the interior at 200 Torr or lower. However, for reasons of economy, taking into account vacuum pump capacities and other considerations, it is desirable to hold the pressure to between 0.1–200 Torr. Further, it is desirable to heat and hold the substrate 2 to a temperature between 1400–1500° C. As the reaction gas, for example a mixture of gases of monomethyltrichlorosilan and hydrogen of a specified equivalent ratio (in general, about an equivalent ratio of 20) is used. When the reaction gas is fed in, the CVD-SiC film is formed on the surface of the substrate 2, that is, on inner and/or outer circumferential surfaces of the substate 2, by a reaction of $CH_3SiCl_3 + H_2 \rightarrow SiC + 3HCl$.

It is noted that a formation of a CVD-SiC film 3 is generally carried out using an atmospheric pressure CVD method in which the reaction gas is fed to the inside of the CVD furnace held at atmospheric pressure. However, with such an atmospheric pressure CVD method, it is difficult to obtain a high-purity CVD-SiC film 3. That is, with the atmospheric pressure CVD method, it is impossible to prevent diffusion of impurities contained in the substrate when the substrate purity is low. Or even if the substrate purity is high, pollutant particles scattered from the CVD furnace wall surface are deposited on the substrate surface, on which the CVD-SiC film is formed, and onto its surrounding areas, which are mixed into the CVD-SiC film 3.

As to film forming methods, in addition to the atmospheric pressure CVD method, there is an intermittent CVD method in which exhaust and reaction gas supplies are repeatedly alternately applied in a specified cycle. According to this intermittent CVD method, pollutant particles are discharged to some extent during the exhaust portions of the cycle, thus, an increase in purity of the CVD-SiC film 3 could be expected. However, the pollutant particles, etc. are not completely discharged during the exhaust portions and it is likely that the pollutant particles remain at starts of reaction-gas-supply portions of the cycle. Hence it is difficult to secure a high purity of the film using the intermittent CVD method, as in the case of the atmospheric pressure CVD method.

As explained above, according to generally adopted CVD methods, impurities are deposited onto the substrate surface and/or the surrounding areas, and they are not removed therefrom. Hence, whatever improvements may be made in the vapor deposition conditions, impurities, such as a large volume of Fe, etc. or pollutants such as excessive Si out of an equivalent ratio of SiC, are contained in the CVD-SiC film 3, so that it is difficult to obtain a high-purity CVD-SiC film 3. However, as described above, if the inside of the CVD furnace is maintained in the reduced-pressure environment (below atmospheric pressure) with exhaust being continuously carried out even when the reaction gas is being supplied, an exhaust stream flowing in the direction of the exhaust port formed at the surface of the substrate 2 on which the CVD-SiC film 3 is to be formed, and at its surrounding area, and in cooperation with migration of impurities to the surface, the surface and the surrounding areas of the substrate 2 are held clean. That is, impurities, such as pollutant particles adhering to the CVD furnace wall surface, reaction gas residue, etc., are discharged quickly, outside of the CVD furnace by the exhaust stream, thereby holding the interior of the CVD furnace clean. As a result, the high-purity CVD-Sic film 3 is formed on the surface of the substrate 2. It should be noted that the reaction gas may be supplied intermittently, but is still desirable to carry out the exhaust continuously, irrespective of the supply or stop-of-supply of the reaction gas. The film thickness (film thickness existing after the specular-surface processing) D of the CVD-SiC film 3 can be suitable set in accordance with conditions; for instance, in accordance with uses of the specular-surface body, such as as a laser reflecting mirror made of the present component material, so long as a strength of adhesion with the substrate 2 is sufficient. In general, it is preferable to set the thickness at 50–200 $\mu$m. If the film thickness is below 50 $\mu$m, defects caused by penetrating holes can be expected, considering variations ($\pm 20 \mu$m) in the film thickness, and problems occur in regard to irradiation of X-rays, etc. Conversely, if the film thickness exceeds 200 $\mu$m a sufficient smoothness cannot be obtained due to enlargement of the crystal, and it takes time to form the film, resulting in high costs.

If a CVD-SiC film is formed, whose film thickness exceeds 200 $\mu$m after the specular-surface processing, because a film forming temperature is extremely high, a residual stress is generated in the film after film forming (after cooling) due to different thermal expansions of the substrate and the film during film forming. As a result, when the film surface is specular-surface processed, it is difficult to obtain a desired specular surface shape. For example, when the specular surface is processed in a plane form, it is likely that the specular surface may become concave or convex under influence of residual stress existing in the film. Also because of this, the film thickness D should not exceed 200 $\mu$m.

In addition, the surface of the CVD-SiC film 3 of the specular-surface body material 1' is specular-surface processed in a desired shape (plane, sphere, non-sphere, etc.) in accordance with applications of the specular-surface body 1. As a specular-surface processing method, a method is adopted which can satisfy the conditions that: (1) a specular surface 3a of surface roughness RMS 10 Å or less can be obtained therewith and in the CVD-SiC film 3; and (2) after the specular-surface processing, the defect-free crystal layer 3b should exist at a depth d that is within 300 Å of the specular surface 3a (that is, the depth d of the quality changed layer or the defective crystal layer 3c generated by the specular-surface processing is less than 300 Å). Specifically, a plasma CVM (Chemical Vaporization Machining) method which is a specular-surface processing method that does not need a physical processing force, an EEM (Elastic Emission Machining) method, etc. are used independently or in combination. The plasma CVM method is a specular-surface processing method to be described later, and the EEM method is a specular-surface processing method which utilizes the principle that when two types of solids are brought into contact, interacting forces (joining forces) are generated at the interface as formed and when they are separated, one solid surface atom removes the other solid surface atom. The EEM method supplies micro particles smaller that submicrons to the surface to be processed under no load conditions and removes, layer by layer, atoms of the surface to be processed by agitating these micro particles.

Now, the specular-surface processing method that satisfies conditions of (1), (2) is specifically explained with the plasma CVM method taken as an example.

A specular-surface processing machine for implementing the plasma CVM method comprises a horizontally movable stage 4 and a spherical electrode 5, rotatably provided on the stage 4, arranged in a clean room as shown in FIG. 2. And, in carrying out specular-surface processing by the plasma CVM method, first of all, the specular-surface body material 1, obtained as described above, is placed on the stage 4 with the CVD-SiC film 3 positioned close to the electrode 5. The clean room is held in a high-pressure environment (preferably higher than 700 Torr and more suitably, 700–750 Torr) and a reaction gas with a high electro negativity (for example, a halogen based gas such as argon, helium, etc. containing about 0.1–5% sulfur hexafluoride ($SF_6$)) is circulated and supplied between the electrode 5 and the CVD-SiC film 3. With the electrode 5 rotated at high speed in a specified direction, using a high-frequency power supply (in general, about 150 MeHz) 7, high-frequency plasma 8 is generated between the electrode 5 and the CVD-SiC film 3 such that atoms with large electro negativity such as halogen, etc. are excited in the high-frequency plasma 8 existing locally (in terms of space) in the high-pressure environment and becomes neutral radicals with higher reactivity. As a result, the excited neutral radicals with high reactivity act on the CVD-SiC film 3 to change atoms on the film surface to an evaporative substance, and removes them. In addition, by allowing the stage 4 to make a horizontal movement, such removal action is extended to the whole film surface. In this way, because the removal reaction acting on the atoms takes place chemically, from a geometrical point of view, the film surface is processed to be a super smooth surface in the order of atoms, and an excellent processed surface, free of disturbances from a crystallographic viewpoint, is obtained. Consequently, formation of the quality changed layer or defective crystal layer 3c which accompanies the specular-surface processing can be avoided as much as possible, and with the defect-free crystal layer 3b existing at the depth d within 300 Å from the specular surface 3a, the CVD-SiC film 3 surface is processed to have the specular surface 3a of a surface roughness RMS 10 Å or less.

It should be noted that when silicon carbide is chemically vapor deposited under normal film forming conditions, a crystal face of the CVD-SiC film is non-oriented or tends to be weakly oriented to the (111) plane; but an atom density on each crystal plane is not identical. For example, the (111) plane has extremely high atom density as compared to other orientations, and chemical activity of the surface is extremely low. Consequently, in this non-oriented or weakly oriented CVD-SiC film, the above-mentioned removal reactions do not take place uniformly due to a difference of crystal orientation, and it is not at all easy to process the surface to be a super smooth surface of surface roughness RMS 10 Å or less, and a depth of the quality changed layer or defective crystal layer 3c (thickness of layer 3c including the specular surface 3a) tends to be great. However, as described above, strongly orienting the CVD-SiC film 3 to one crystal plane ("the plane to be oriented to") enables uniform removal reaction by neutral radicals to take place, and does not give rise to this problem. However, this advantage is not markedly exhibited when the degree of orientation is low (when the X-ray diffraction intensity ratio of "the plane to be oriented to" is below 90% at peak intensity). Consequently, in addition to properly selecting the surface processing method, strongly orienting the CVD-SiC film 3 to "the plane to be oriented to" (specified oriented plane) in forming the top layer of the specular-surface body 1 with the CVD-SiC film 3 is extremely important for processing the specular-surface body 1 which has the specular surface 3a of surface roughness less than RMS 10 Å and having the defect free crystal layer 3b at the depth d within 300 Å from the specular surface 3a. The specular surface 3a is further processed if required. For example, when the specular-surface body 1 is used as a diffraction grating, processing (etching, etc.) is carried out for forming specified diffraction grooves on the specular surface 3a.

The specular surface 3a of the specular-surface body 1 obtained as described above is not damaged even when X-rays, SOR beams, laser beams, and other high energy beams are irradiated thereon, as proven in the embodiment to be discussed later. Further, it has a greatly increased resistance against beam irradiation as compared to conventional specular-surface bodies and can be suitably used as a reflecting mirror, diffraction gratings, etc. for X-rays, SOR beams, laser beams, etc.

It is to be understood that the present invention is not limited to the embodiment described above, but can be suitably improved and modified within the scope of basic principles of the invention. For example, the specular-surface body 1 may be of a compound structure whose top layer is made of the CVD-SIC film 3 as described above, but in addition, it is also possible to form the whole body, including the top layer, of a single crystal structure of silicon carbide. Any method that satisfies the conditions (1), (2) is acceptable as the specular-surface processing method, and shall not be particularly limited.

EMBODIMENT EXAMPLES

For Embodiment 1, a high-purity silicon carbide powder (particle size: less than 1 $\mu$m) was molded without using a binder and sintered, for producing the substrate, which is a silicon carbide sintered material of 100 mm in diameter, 10 mm thick, and 95% in density. The substrate was placed in a CVD furnace, and while the substrate was heated and held at 1500° C. monomethyltrichlorosilan and hydrogen of 20 equivalent ratio were continuously fed into the CVD furnace. During this period, exhaust was continuously carried out with a vacuum pump connected to an exhaust port of the CVD furance, and the inside of the furnace was held at a reduced pressure atmosphere of 50 Torr. Thus, a specular-surface body material with the CVD-SiC film (β-SiC (3C)) of 120 μm film thickness and 520 nm spectral absorption end was obtained. In this CVD-SiC film, an excessive Si being out of the chemical equivalent ratio scarcely exists and only extremely small amounts of heavy metal elements are contained in the film (Fe: 30 ppb, Cu: 50 ppb or less, Cr: 40 ppb or less). The crystal faces of the CVD-SiC film are strongly oriented to the (220) plane (X-ray diffraction intensity ratio of the (220) plane is 90%).

A specular-surface body material obtained in this way was subjected to the specular-surface processing by the above-mentioned plasma CVM method using the specular-surface processing machine shown in FIG. 2, and a CVD-SiC film surface was processed to form a specular surface of surface roughness RMS 10 Å or less under conditions of: clean room pressure—750 Torr (1 atm); high-frequency power supply—150 MeHz; reaction gas—argon gas containing $SF_6$ of 1%; electrode—alumina sphere; and electrode rotating speed—1500 rpm. As a result, the specular-surface body $1_1$ according to this invention was obtained.

For Embodiment 2, a specular-surface body material identical to the one used in Embodiment 1 was obtained, and the CVD-SiC film surface was specular-surface processed by the plasma CVM method under the same conditions of Embodiment 1 except that an electrode rotation speed of Embodiment 2 was 3000 rpm. As a result, a specular-surface body $1_2$ according to this invention was obtained.

For Embodiment 3, a specular-surface body material identical to the one used in Embodiment 1 was obtained, and the CVD-SiC film surface was specular-surface processed by the plasma CVM method under the conditions completely identical to those in Embodiment 1 except that an electrode rotation speed of Embodiment 3 was 3600 rpm. As a result, a specular-surface body $1_3$ according to this invention was obtained.

For a comparative Example 1, after obtaining a specular-surface body material identical to the one used in Embodiment 1, the CVD-SiC film surface was specular-surface processed by a mechanical surface processing method, and a specular-surface body $1_4$ corresponding to a conventional specular-surface body was obtained. That is, the film surface was specular-surface processed using a liquid-form abrasive material with abrasive grains dispersed in a colloidal form. While the abrasive material was allowed to drip to a cast-iron rotary panel, the rotary panel and a film surface of the specular-surface body material placed against the rotary panel were caused to have relative movement in the horizontal direction, with the abrasive material interposed therebetween. That is to say, while the rotary panel was rotated at 20–50 rpm, the specular-surface body material was moved back and forth in a radial direction on the rotary panel.

For a Comparative Example 2, after obtaining the specular-surface body material identical to the one used in Embodiment 1, the CVD-SiC film surface was specular-surface processed by a mechanical surface processing method different from that of Comparative Example 1, and a specular-surface body $1_5$ corresponding to a conventional specular-surface body was obtained. That is, after the CVD-SiC film surface was roughly processed by diamond abrasive grains, it was further precision-polished with diamond abrasive grains for specular-surface processing the film surface.

With respect to each of the specular-surface bodies $1_1$, $1_2$, $1_3$, $1_4$, $1_5$, obtained as described above, the distance d from the specular surface (i.e. the processed surface) to the portion where a defect-free crystal layer starts to exist (that is, the depth of the defect-free crystal layer) was measured by atomic force microscope (AFM). This measurement was carried out at any 5 points (1)–(5), and the mean values of 5 points were obtained. The root mean square (RMS) roughness (Å) in the specular surface of each specular-surface body $1_1$, $1_2$, $1_3$, $1_4$, $1_5$ was measured.

The results are shown in Table 1 and, for each of the specular-surface bodies $1_1$, $1_2$, $1_3$ of embodiments, the depth d of the defect-free crystal layer at each measuring point (1)–(5), and their mean values, were 300 Å or less. On the contrary, for each of the specular-surface bodies $1_4$, $1_5$ of the comparative examples, the depth d of the defect-free crystal layer at each measuring point 1–5, and their mean values, greatly exceeded 300 Å. With respect to the surface smoothness of the specular surface, in all of the specular-surface bodies $1_1$, $1_2$, $1_3$, $1_4$, $1_5$ it was 10 Å or less, which permits the specular-surface bodies to be used as X-ray mirrors, etc.

TABLE 1

| Specular surface | Depth d (Å) to defect-free crystal layer | | | | | | surface roughness RMS (Å) | White turbidity |
|---|---|---|---|---|---|---|---|---|
| | (1) | (2) | (3) | (4) | (5) | Mean | | |
| Embodiments | | | | | | | | |
| $1_1$ | 250 | 300 | 300 | 50 | 150 | 210 | 7 | No |
| $1_2$ | 300 | 250 | 100 | 100 | 200 | 190 | 8 | No |
| $1_3$ | 200 | 250 | 300 | 200 | 250 | 240 | 8 | No |
| Comparison | | | | | | | | |
| $1_4$ | 1800 | 1300 | 2200 | 1150 | 2750 | 1840 | 10 | Yes |
| $1_5$ | 3500 | 2000 | 3250 | 2500 | 2500 | 2750 | 9 | Yes |

In order to confirm resistance against irradiation of high energy beam, each of the specular-surface bodies $1_1$, $1_1$, $1_3$, $1_4$ $1_5$ was used in the Argon Excimer Laser Resonator Reflecting Mirror, and the Argon Excimer Laser was irradiated (1 pulse) in which the intensity inside the resonator is 2 MW, with the time of 1 pulse being 5 ns. The laser irradiated portion was observed visually by Nomarski differential-interference microscope.

As a result, with respect to the specular-surface bodies $1_4$, $1_5$ of Comparisons, apparent turbidity was recognized even visually at the laser irradiated portion. The Nomarski differential-interference microscope revealed apparent damage at the laser irradiated portion. That is, it was confirmed that the laser irradiated portion changed to have an appearance of fine foam, and looked as if the portion was melted instantly.

On the other hand, for the specular-surface bodies $1_1$, $1_1$, $1_3$ of Embodiments, no white turbidity was observed visually at the laser irradiated portions. The Nomarski differential-interference microscope also revealed that the damage described above was not inflicted on the irradiated portions at all.

When the irradiation by the argon excimer laser was repeated 10 times, the specular-surface bodies $1_4$ $1_5$ of the comparative Examples were broken. But no breakage occurred in the specular surface bodes $1_1$, $1_2$, $1_3$. Silicon was deposited locally in these embodiments, but no white turbidity could be visually recognized.

Based on this, it is clear that for a specular-surface body according to the present invention in which a defect-free crystal layer exists at the depth 300 Å from the specular surface, resistance against beam irradiation is greatly improved as compared to the conventional specular-surface bodies, and it has been confirmed that it can be used as an X-ray mirror, etc. for high energy beams.

EFFECT OF THE INVENTION

As can be easily understood from the above explanation, resistance of a specular-surface body of the invention against beam irradiation is greatly improved, and such a specular-surface body can be suitably used as reflecting mirrors, diffraction gratings, etc. for high energy beams such as X-rays, SOR beams, laser beams, etc. with greatly increased practical value.

I claim:

1. A specular-surface body having silicon carbide top layer wherein a surface of the top layer has been processed to be a specular surface wherein a defect free crystal layer of silicon carbide exists at a depth within 300 Å from the specular surface.

2. The specular-surface body of claim 1, wherein the top layer is composed of a chemically vapor deposited silicon carbide film and the silicon carbide film has a crystal structure strongly oriented to one crystal plane represented by specific Miller indices in such a manner that an X-ray diffraction intensity ratio of the crystal plane becomes 90% or more at peak intensity.

3. The specular-surface body of claim 2, wherein the crystal plane specified by Miller indices is the (220) plane.

4. The specular-surface body of claim 2, wherein a high density $\alpha$ silicon carbide or $\beta$ silicon carbide sintered material of theoretical density of 90% or higher is used as a substrate on which the silicon carbide film is chemically vapor deposited.

5. The specular-surface body of claim 2, wherein the film thickness of the silicon carbide film existing after the film has been processed to form the specular surface thereon is 50–200 $\mu$m.

6. The specular-surface body of claim 1, wherein the surface of the top layer is processed to be a specular surface of surface roughness RMS 10 Å or less.

* * * * *